US007832356B2

(12) United States Patent  (10) Patent No.: US 7,832,356 B2
Kleinsasser  (45) Date of Patent: Nov. 16, 2010

(54) FEEDER FOR ANIMALS

(75) Inventor: Jonathan Kleinsasser, Ste. Agathe (CA)

(73) Assignee: Crystal Spring Colony Farms Ltd, Ste. Agathe, MB ( * ) Notice: Subject to any disclaimer, the term of this patent is extended or adjusted under 35 U.S.C. 154(b) by 363 days.

(21) Appl. No.: 11/565,928

(22) Filed: Dec. 1, 2006

(65) Prior Publication Data
US 2008/0127901 A1 Jun. 5, 2008

(51) Int. Cl.
A01K 5/01 (2006.01)

(52) U.S. Cl. .................... 119/51.11; 119/52.1; 119/51.5

(58) Field of Classification Search ............. 119/51.01, 119/51.5, 52.1, 51.11
See application file for complete search history.

(56) References Cited

U.S. PATENT DOCUMENTS

| 3,196,835 | A | * | 7/1965 | Bergevin | 119/51.11 |
| 3,547,081 | A | * | 12/1970 | Geerlings | 119/51.11 |
| 4,182,273 | A | * | 1/1980 | Peterson | 119/51.5 |
| 4,256,054 | A | * | 3/1981 | Hitchcock | 119/51.11 |
| 4,660,508 | A |  | 4/1987 | Kleinsasser et al. | |
| 4,688,520 | A | * | 8/1987 | Parks | 119/51.11 |
| 4,790,266 | A |  | 12/1988 | Kleinsasser et al. | |
| 4,911,727 | A | * | 3/1990 | King | 119/53 |
| 5,010,849 | A | * | 4/1991 | Kleinsasser | 119/53 |
| 5,036,798 | A | * | 8/1991 | King | 119/53.5 |
| 5,311,838 | A | * | 5/1994 | Thomas et al. | 119/51.5 |
| 5,603,285 | A | * | 2/1997 | Kleinsasser | 119/53 |
| 5,640,926 | A |  | 6/1997 | Kleinsasser | |
| 5,967,083 | A |  | 10/1999 | Kleinsasser | |
| 6,868,801 | B2 | * | 3/2005 | Rovira et al. | 119/51.5 |

FOREIGN PATENT DOCUMENTS

GB 2212045 A * 7/1989

* cited by examiner

Primary Examiner—Rob Swiatek
Assistant Examiner—Kristen C Hayes
(74) Attorney, Agent, or Firm—Adrian D. Battison; Ade & Company Inc.

(57) ABSTRACT

A feeder for feeding animals at the weanling stage has a trough with two opposed outwardly inclined front walls over which the animals can reach for taking feed from the trough and a feed hopper for discharging feed downwardly onto a shelf above the trough. Water is supplied into the trough so that the animals may take the feed dry on the shelf or wet from the trough. Water is normally supplied through a first water supply line which has a series of nipples controlled by the animals. However, while the weanlings are very young the first water supply line is closed off and water is supplied from a second supply line which is managed by a timer and water level sensor.

9 Claims, 1 Drawing Sheet

FEEDER FOR ANIMALS

This invention relates to a feeder for animals, of the type for feeding dry feed in particulate form, which includes a substantially horizontal surface beneath a hopper so that the feed from the hopper is discharged onto the surface from which the feed can be transferred by the animal to a trough for mixing with water.

BACKGROUND OF THE INVENTION

An example of a feeder of this type is shown in U.S. Pat. Nos. 4,660,508 and 4,790,266 of the present inventor and this type of feeder has become very successful and is widely known as a wet/dry feeder in view of the fact that the animal can take dry feed from the shelf of the feeder or can apply water into feed discharged into the trough to take the feed in the trough in wet condition.

The intention is that the animals themselves control the amount of water supply by providing nipples in the trough which can be actuated by the animal to discharge water into the trough to mix with the feed. One advantage of this type of feeder is that the animals can mix the feed to the consistency they prefer so that they are encouraged to eat as much as possible by ensuring that they are not discouraged from eating by the feed being too dry or too wet. It has been found that this type of feeder has considerable increase in weight gain for the animals over conventional dry feeders.

Feeders of this type can either be double sided that is the feeder has two sides each of which can be accessed by a different set of animals so that generally the feeder is placed in a fence line to supply feed to animals in two separate panic. Other type of feeders are however single sided so that they have generally a vertical rear wall with the trough presented forwardly of that rear wall and the animals accessing the feeder only from the trough side of the rear wall.

In U.S. Pat. No. 5,640,926 of the present inventor issued Jun. 24, 1997 is disclosed a feeder of the above type. In this feeder, the height of the shelf from the trough is adjustable so as to accommodate a change in size of the animals from a smaller size up to a larger size as the animals grow.

In U.S. Pat. No. 5,967,083 of the present inventor issued Oct. 19, 1999 is disclosed a feeder of the above type. In this feeder, the height of the side wall of the trough from the base of the trough is adjustable so as to accommodate a change in size of the animals from a smaller size up to a larger size as the animals grow.

Feeders of this type are designed and manufactured for hogs from weanlings up to finishers and the above adjustable types can be used in some circumstances to accommodate growth or different feeders of fixed dimensions for different sizes of animal may be provided.

One problem which has existed since the invention of this type of feeder is that very young weanlings have a tendency to play with or activate the water nipples due to their recent suckling and hence they release too much water into the trough so that the feeder becomes overwhelmed with consequent blocking of the feed supply to the shelf. Of course the presence of the excess water also inhibits the feed intake of the animals. It has been noted that after a few days or weeks the animals lose this tendency and manage the water supply by activating the nipples only when they require as do older animals. However the difficulties during the first days or weeks have dramatically reduced the acceptability of the feeder for weanlings despite its known feed uptake advantages. Many operators will therefore not use this type of feeder for weanlings due to the repeated attention and maintenance which is required during this initial stage.

Many attempts have been made to overcome this problem during the past twenty years by controlling the water supply to the nipples so that the amount dispensed is reduced. Up to now all of these attempts have been unsuccessful and a significantly reduced percentage of feeders of this type are used for weanlings. Only those operators who are willing to accept the repeated maintenance to remove excess water and to clean the resulting mess and blockage problems are able to use this type successfully.

SUMMARY OF THE INVENTION

It is one object of the present invention to provide an improved feeder for animals which allows the use of the above type of feeder by very young weanlings.

According to a first aspect of the invention there is provided a feeder unit for animals comprising:

an elongate trough having a base and a sidewall for receiving and containing feed and water and arranged such that the head of the animal an reach over an upper front edge of the sidewall to the base for eating the feed and water;

an elongate shelf extending substantially along a full length of the trough and providing a substantially horizontal surface for receiving feed;

the horizontal surface of said shelf being arranged at a height above and rearwardly of said front edge so as to allow access by the head of the animal to said shelf for direct feeding therefrom, and between said shelf and said front edge to the base;

a hopper for depositing feed onto said shelf arranged such that deposited feed on the shelf remains on said shelf but can be removed to the trough by the animal a first water supply line for dispensing water into the trough arranged such that it avoids dispensing water onto the shelf;

at least one nipple on the first water supply line actuable by the animal for controlling the dispensing of the water into the trough;

and a second water supply line for dispensing water into the trough arranged such that it avoids dispensing water onto the shelf independently of the at least one nipple such that the first water line can be closed and the second water line opened to supply water on a managed basis while the animals are too young to control the nipple.

Preferably the nipple of the first water supply line is arranged beneath the shelf and arranged to direct water downwardly therefrom into the trough.

Preferably the nipple is arranged such that the animal is not intended to drink directly from it.

Preferably the second water supply line has a discharge mouth arranged beneath the shelf and arranged to direct water into the trough.

Preferably the second supply line includes a timed valve for periodically shutting off water supply to the second water supply line.

Preferably the second supply line includes a water level control for shutting off water supply to the second water supply line when the water reaches a predetermined level.

Preferably the second supply line includes a water level control for shutting off water supply to the second water supply line when the water reaches a predetermined level and a timed valve arranged for periodically opening so as to allow supply into the trough of a dose of water up to the predetermined level.

Preferably the water level control is arranged in the second supply line above a discharge mouth of the second supply line and arranged to close off the supply of water to the second supply line when the discharge mouth is covered by the water in the trough.

Preferably the trough has a flat bottom such that the depth of water in the trough is substantially constant.

According to a second aspect of the invention there is provided a method of feeding pigs as they grow from weaning to an older stage comprising:

at a first stage immediately after weaning from the mother sow, providing for the pigs access to a feeder comprising:

an elongate trough having a base and a sidewall for receiving and containing feed and water and arranged such that the head of the pig an reach over an upper front edge of the sidewall to the base for eating the feed and water;

an elongate shelf providing a substantially horizontal surface for receiving feed;

the horizontal surface of said shelf being arranged at a height above and rearwardly of said front edge so as to allow access by the head of the pig to said shelf for direct feeding therefrom, and between said shelf and said front edge to the base;

a hopper for depositing feed onto said shelf arranged such that deposited feed on the shelf remains on said shelf but can be removed to the trough by the pig;

a water supply line for dispensing water into the trough arranged such that it avoids dispensing water onto the shelf, and managing the water supply to the trough through the supply line by a water control system which is not activated by the pigs;

and at a second stage when the animals have become older, providing for the pigs access to a feeder comprising:

an elongate trough having a base and a sidewall for receiving and containing feed and water and arranged such that the head of the pig an reach over an upper front edge of the sidewall to the base for eating the feed and water;

an elongate shelf providing a substantially horizontal surface for receiving feed;

the horizontal surface of said shelf being arranged at a height above and rearwardly of said front edge so as to allow access by the head of the pig to said shelf for direct feeding therefrom, and between said shelf and said front edge to the base;

a hopper for depositing feed onto said shelf arranged such that deposited feed on the shelf remains on said shelf but can be removed to the trough by the pig;

a water supply line for dispensing water into the trough arranged such that it avoids dispensing water onto the shelf;

and managing the water supply to the trough through the supply line by providing on the supply line at least one nipple actuable by the pigs for controlling the dispensing of the water into the trough;

In one example according to the present invention, the feeder at the first stage and the feeder at the second stage are the same feeder which has a first supply line controlled by said at least one nipple and a second supply line controlled by a water supply control arranged to be managed by a person.

However as an alternative the feeder at the first stage is a first feeder which has the supply line arranged to be managed by a person and the feeder at the second stage is a second feeder which has the supply line arranged controlled by said at least one nipple and the pigs are arranged after they have grown to the second stage to have access to the second feeder rather than the first.

According to a third aspect of the invention there is provided a method of feeding pigs comprising:

immediately after weaning from the mother sow, providing for the pigs access to a feeder comprising:

an elongate trough having a base and a sidewall for receiving and containing feed and water and arranged such that the head of the pig an reach over an upper front edge of the sidewall to the base for eating the feed and water;

an elongate shelf providing a substantially horizontal surface for receiving feed;

the horizontal surface of said shelf being arranged at a height above and rearwardly of said front edge so as to allow access by the head of the pig to said shelf for direct feeding therefrom, and between said shelf and said front edge to the base;

a hopper for depositing feed onto said shelf arranged such that deposited feed on the shelf remains on said shelf but can be removed to the trough by the pig;

a water supply line for dispensing water into the trough arranged such that it avoids dispensing water onto the shelf;

and managing the water supply to the trough through the supply line by providing a water level control for shutting off water supply when the water reaches a predetermined level and a timed valve arranged for periodically opening so as to allow supply into the trough of a dose of water up to the predetermined level, after which dose the timed valve is closed.

BRIEF DESCRIPTION OF THE DRAWINGS

Embodiments of the invention will now be described in conjunction with the accompanying drawings in which.

DETAILED DESCRIPTION

Figure 1:
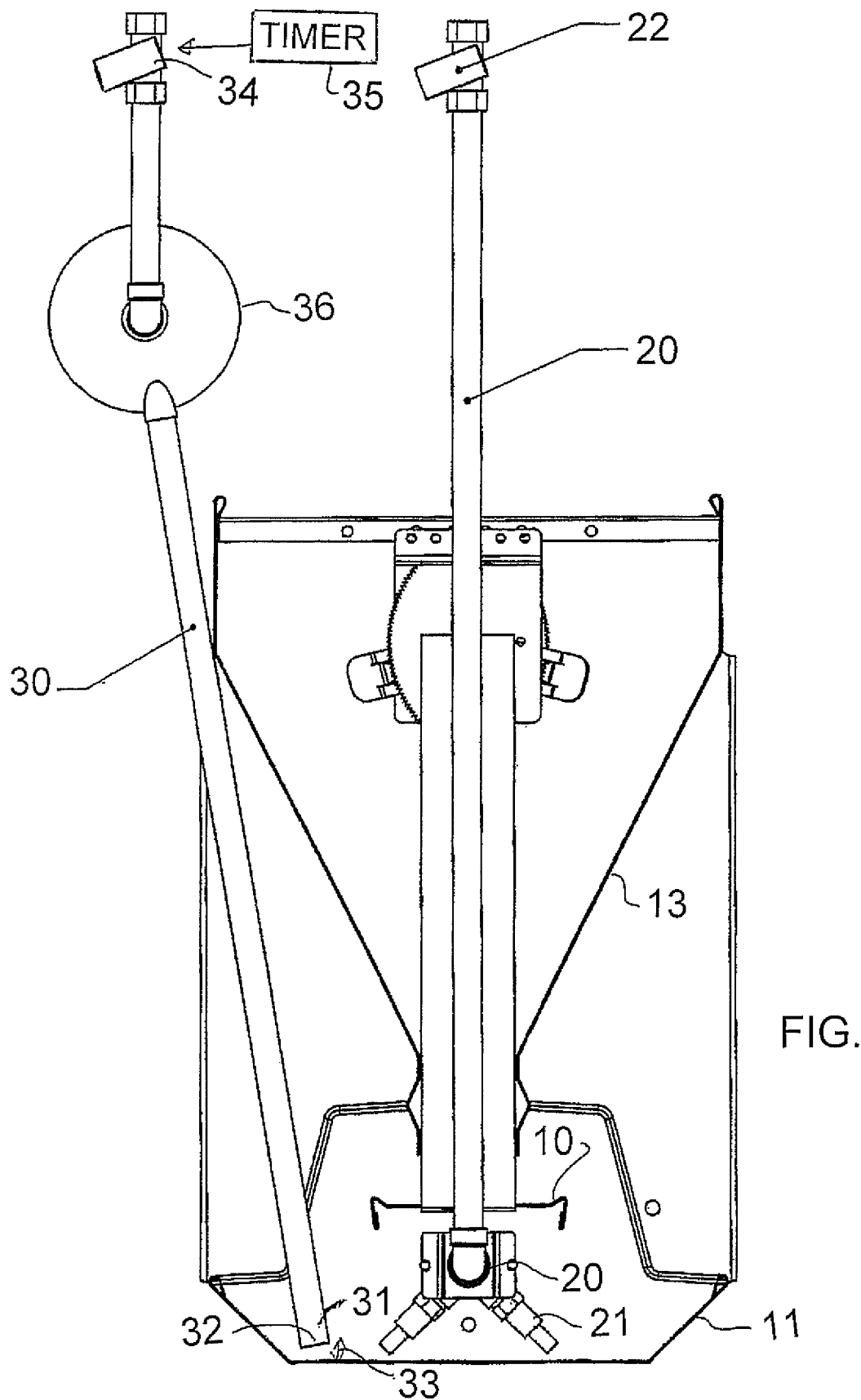
FIG. 1 is a vertical cross sectional view through an embodiment of feeder according to the present invention. The embodiment is partly disclosed in U.S. Pat. No. 5,967,083 of the present inventor issued Oct. 19, 1999, the disclosure of which is incorporated herein by reference for further details required by the reader, bearing in mind that such feeders are well known to a person skilled in this art.

The embodiment shown in FIG. 1 is of the type shown a wet and dry feeder or shelf-type feeder in which the feed is deposited onto a shelf 10 positioned above a trough 11 so that the feed is available in dry condition on the shelf 10 accessible by the animal and can be moved by the animal to the trough for mixing with water for taking in wet condition. A hopper 13 is located above the shelf for depositing the feed on the shelf. This type of feeder is well known and further details are shown in the above three patents of the present inventor, the disclosures of which are incorporated herein by reference.

The feeder can be double sided or single sided as is well known. The feeder can be adjustable as described in the second and third above patents or may be a fixed size feeder as disclosed in the first above patent.

Beneath the shelf is a first water fine 30 and a second water line 20 with the water line 20 having a series of animal controlled nipples 21 at spaced positions along the length of the water line which can be actuated by the animal to discharge water into the trough from the second water line. The nipples can be bite nipples which are not intended to drink from but discharge into the trough or they may be drinking nipples. When actuated water runs freely from the water supply line 20 into the trough 11.

Alongside and generally parallel to the second water line 20 is the first water line 30 with a discharge spout 31 which is free to discharge openly into the trough with no animal control. One or more spouts may be provided at positions along the trough. The spout 31 has a bottom discharge mouth 32 spaced from the flat bottom of the trough by a distance 33.

The second water line is controlled by a valve 22 actuable manually and the first water line is controlled by a valve 34 actuated manually or by a timer 35. The first water line 30 also includes an automatic water level control 36 of the type which halts flow of water when the mouth 32 is covered by water due to pressure changes detected by the sensor. This provides a level of water 33 which is constant over the flat base of the trough.

Immediately after the animals are weaned, in a first stage of growth, while the animals are too young to control the nipple to properly manage water supply, the second water line is closed using the valve 22 to prevent supply of water through the nipples and the first water line is periodically opened by the timer to supply water on a managed basis. The water supply to the trough through the supply line is controlled by providing the water level control 36 for shutting off water supply when the water reaches a predetermined level and the timed valve 35 arranged for periodically opening so as to allow supply into the trough of a dose of water up to the predetermined level. After the dose the timed valve is closed. The water level control is arranged in the supply line above a discharge mouth of the supply line and arranged to close off the supply of water to the supply line when the discharge mouth is covered by the water in the trough. The intention is that the timing of the valve 34 is relatively infrequent and relatively short so that the dose of water is supplied periodically. Thus a dose might be sufficient for the number of animals having access to the feeder to last a number of hours. No further water is then supplied until the timer is again turned on despite the fact that the water may be wholly or partly consumed exposing the mouth 32. In this way the pigs being fed by feeder cannot dispense additional water into the trough which can otherwise flood and cause the dry feed on the shelf to become wetted and block. At the same time when the animals become short of water they will tend to clean around the trough in the attempt to take up any remaining moisture thus consuming all of the remaining feed with the high weight gain required and removing any unused feed material to provide an effective clean up.

When the animals have become older, in a second stage of growth, thus reducing their tendency to play with the nipples and they have become old enough to understand how the system can be used to manage the wetness of their feed, the first water line is closed and the second water line is opened to allow the animals to control the supply of water through the nipples. The feeder then operates in the conventional wet/dry mode well known in the industry.

In many cases the feeder at the first stage and the feeder at the second stage are the same feeder which has a second supply line controlled by the nipples and a first supply line controlled by the water supply control arranged to be managed by a person.

However the feeder at the first stage may be a first feeder which has the supply line arranged to be managed by a person and the feeder at the second stage is a different second feeder which has the supply line arranged controlled by said at least one nipple. Thus the first feeder has only the supply line 30 and its associated components and not the supply line 20 or the nipples 21.

The management of the water supply through the line 30 can be wholly controlled by the timer 35 and valve 34 without the level sensor 36 using timing of flow at a known flow rate to dispense the required dose of water at an amount sufficient to last several hours without being sufficient to flood the trough to a level where the amount of water interferes with the conventional feed supply to the shelf and trough as well known in wet/dry feeders.

I claim:

1. A method of feeding pigs as they grow from weaning to an older stage comprising:
   providing for the pigs access to a feeder;
   providing in the feeder an elongate trough having a base and a sidewall for receiving and containing feed and water and arranged such that the head of the pig can reach over an upper front edge of the sidewall to the base for eating the feed and water;
   providing in the feeder an elongate shelf providing a substantially horizontal surface for receiving feed;
   the horizontal surface of said shelf being arranged at a height above and rearwardly of said front edge so as to allow access by the head of the pig to said shelf for direct feeding therefrom, and between said shelf and said front edge to the base;
   providing in the feeder a hopper for continually depositing feed onto said shelf arranged such that deposited feed on the shelf remains on said shelf but can be removed to the trough by the pig;
   providing in the feeder a water supply for dispensing water into the trough;
   during a first stage of growth starting immediately after weaning from a mother sow:
   periodically, independently of the pigs, controlling the water supply to the trough so as to supply water in sufficient quantity into the trough to control filling of the trough up to a predetermined level of the trough arranged such that it avoids dispensing water onto the shelf;
   and periodically causing the pigs to clean up the trough by halting the water supply into the trough for a time period sufficient for the water to be wholly consumed;
   and during a second stage after the first stage when the animals have become older:
   managing the water supply to the trough by providing at least one nipple actuable by the pigs for control by the pigs of the dispensing of the water into the trough arranged such that said at least one nipple avoids dispensing water onto the shelf.

2. The method according to claim 1 wherein the feeder at the first stage and the feeder at the second stage are the same feeder.

3. A method of feeding pigs as they grow from weaning to an older stage comprising:
   providing for the pigs access to a feeder;
   providing in the feeder an elongate trough having a base and a sidewall for receiving and containing feed and water and arranged such that the head of the pig can reach over an upper front edge of the sidewall to the base for eating the feed and water;
   providing in the feeder an elongate shelf providing a substantially horizontal surface for receiving feed;
   the horizontal surface of said shelf being arranged at a height above and rearwardly of said front edge so as to allow access by the head of the pig to said shelf for direct feeding therefrom, and between said shelf and said front edge to the base;
   providing in the feeder a hopper for continually depositing feed onto said shelf arranged such that deposited feed on the shelf remains on said shelf but can be removed to the trough by the pig;
   during a first stage of growth starting immediately after weaning from a mother sow:
   providing a first water supply line for dispensing water into the trough arranged such that it avoids dispensing water onto the shelf;

providing in the first water supply line a water level control valve for shutting off water supply through the first water supply line when the water reaches a predetermined level in the trough;

providing in the first water supply line a timed valve arranged for periodically opening and closing water flow through first water supply line;

periodically operating the timed valve to open the timed valve so as to supply water into the trough in sufficient quantity such that the water level control valve controls filling of the trough up to the predetermined level of the trough;

and periodically causing the pigs to clean up the trough by operating the timed valve to close the timed valve so as to halt supply of water for a time period sufficient for the water to be wholly consumed;

and during a second stage after the first stage when the animals have become older:

providing a second water supply line for dispensing water into the trough arranged such that it avoids dispensing water onto the shelf;

managing the water supply to the trough by providing at least one nipple on the second water supply line actuable by the pigs for control by the pigs of the dispensing of the water into the trough.

4. The method according to claim 3 wherein the feeder at the first stage and the feeder at the second stage are the same feeder.

5. The method according to claim 3 wherein the at least one nipple of the second water supply line is arranged beneath the shelf and arranged to direct water downwardly therefrom into the trough.

6. The method according to claim 3 wherein said at least one nipple is arranged such that the animal is not intended to drink directly from it.

7. The method according to claim 3 wherein the first water supply line has a discharge mouth arranged beneath the shelf and arranged to direct water into the trough.

8. The method according to claim 3 wherein the water level control is arranged in the water supply line above a discharge mouth of the water supply line and arranged to close off supply of water to the water supply line when the discharge mouth is covered by the water in the trough.

9. The method according to claim 3 wherein the trough has a flat bottom such that the depth of water in the trough is substantially constant.

* * * * *